United States Patent [19]

Yazami et al.

[11] Patent Number: 5,605,772
[45] Date of Patent: Feb. 25, 1997

[54] COMPOSITE CARBON/POLYMER ELECTRODE FOR A RECHARGEABLE ELECTROCHEMICAL LITHIUM CELL

[75] Inventors: Rachid Yazami, Saint Nazaire Les Eymes; Marc Deschamps, Belley; Michel Moreau, Clichy, all of France

[73] Assignee: Le Carbone Lorraine, Courbevoie, France

[21] Appl. No.: 525,006

[22] Filed: Sep. 8, 1995

[30] Foreign Application Priority Data

Sep. 9, 1994 [FR] France .................... 94 10998

[51] Int. Cl.⁶ ................... H01M 4/36; H01M 10/40
[52] U.S. Cl. ................. 429/190; 429/192; 429/197; 429/212; 429/218
[58] Field of Search .................... 429/192, 191, 429/190, 194, 197, 218, 223, 224, 212, 209; 423/414, 445 R; 252/182.1

[56] References Cited

U.S. PATENT DOCUMENTS

| | | | |
|---|---|---|---|
| 5,162,170 | 11/1992 | Miyabayashi et al. | 429/217 X |
| 5,219,680 | 6/1993 | Fauteux | 429/192 |
| 5,232,795 | 8/1993 | Simon et al. | 429/192 |
| 5,296,318 | 3/1994 | Gozdz et al. | |
| 5,468,571 | 11/1995 | Fujimoto et al. | 429/217 |

FOREIGN PATENT DOCUMENTS

| | | |
|---|---|---|
| 404578 | 12/1990 | European Pat. Off. |
| 510236 | 10/1992 | European Pat. Off. |
| 517069 | 12/1992 | European Pat. Off. |
| 528557 | 2/1993 | European Pat. Off. |
| 2690567 | 10/1993 | France. |

OTHER PUBLICATIONS

"Molecular Crystals and Liquid Crystals", Yazami et al. vol. 245, pp. 165–170, 1994. (month) (month not available).

"Electrochemical Insertion of Sodium into carbon", Doeff et al, Jour. of the Electrochemical Society, vol. 140, No. 12, 1993, (month) pp. 1169–1170. (month not available).

*Primary Examiner*—Anthony Skapars
*Attorney, Agent, or Firm*—Dennison, Meserole, Pollack & Scheiner

[57] ABSTRACT

A composite carbon/polymer electrode for a rechargeable electrochemical lithium cell comprises a powder of carbonaceous material and a coating polymer rendered ionically conductive by the addition of a lithium salt, and possibly carbon black or carbon fibers. The carbonaceous material has a proportion of volatile matter between 5 and 22 wt %, and is preferably a raw coke or a semi-coke.

17 Claims, 1 Drawing Sheet

5,605,772

COMPOSITE CARBON/POLYMER ELECTRODE FOR A RECHARGEABLE ELECTROCHEMICAL LITHIUM CELL

DESCRIPTION OF THE INVENTION

The present invention relates to the field of rechargeable electrochemical lithium cells, particularly to the negative electrodes of these cells.

DESCRIPTION OF RELATED ART

Rechargeable electrochemical cells (or secondary cells) based on alkaline metals, particularly lithium, are advantageous due to their high energy density (or charge) and the weight reduction which is enabled. In practice, the construction of these cells has long consisted of the assembly of a metallic lithium negative electrode, an organic liquid electrolyte, and a positive electrode permitting the insertion of lithium atoms. The metallic lithium provides a very high charge density and makes it possible to discharge and recharge the cell very quickly.

The cells embodied according to this practice had several drawbacks. On one hand, the liquid electrolytes, which are highly chemically reactive, can leak out from the cell, thus causing problems with corrosion and contamination. On the other hand, the metallic lithium reduces the electrolyte and decomposes during recharging, which leads to a substantial reduction of the reversible capacity.

In order to eliminate these drawbacks, it has been proposed on one hand to use a polymer-based solid electrolyte with high ionic conductivity at ambient temperature (M. Alamgir and K. M. Abraham, in Lithium Batteries, edited by G. Pistoïa, Chapter 3, 1994), and on the other hand to replace the metallic lithium negative electrode with a graphite-based electrode which intercalates the lithium (R. Yazami and Pt. Touzain, J. Power Sources 9, 1983, p. 365). The latter idea has been expanded upon, and the known prior art includes manufacturing a composite carbon/polymer electrode constituted by an agglomerated graphite carbon powder coated with a polymer which has been rendered ionically conductive by the addition of a lithium salt.

The capacities of electrodes are evaluated with the aid of practical parameters, which are measured under conditions comparable to the stresses of utilization. This is particularly true of the charge density, which is expressed in specific reversible capacity, Qr (in mAh/g), or in surface reversible capacity, Qs (in mAh/cm$^2$), that is the quantity of electrical charge per unit of mass or per unit of surface area of active material that the electrode can produce during the discharge. The specific or surface reversible capacities are generally evaluated at a discharge rate J greater than 1 mA/cm$^2$, which corresponds to normal conditions of utilization.

For use in so-called "volume" cells (such as car batteries with a liquid electrolyte medium), it is desirable to seek the highest possible specific reversible capacity, whereas for use in so-called "flat" cells (such as cells with a polymer electrolyte), it is preferable to maximize the surface reversible capacity.

With a metallic lithium electrode, a specific reversible capacity on the order of 1000 mAh/g and a surface reversible capacity between 0.5 and 1.5 mAh/cm$^2$ are observed at current densities on the order of the mA/cm$^2$. These reversible capacity values are low relative to the theoretical values and are due to the fact that in practice, only a thin surface layer of the lithium electrode (about 5 µm) is used. Composite carbon/polymer electrodes, on the other hand, do not have this disadvantage because more of their volume is used. Nevertheless, the reversible capacities obtained in practice with composite carbon/polymer electrodes barely exceed 325 mAh/g in specific value and 0.5 mAh/cmin surface value under C/10 operating conditions, that is under a discharge current which corresponds to a 10-hour discharge of an electrode of carbonaceous material which has been lithiated according to the LiC$_6$ formula which corresponds to the theoretical case of graphite (R. Yazami, K. Zaghib and M. Deschamps, Molecular Crystals and Liquid Crystals, Vol. 245, 1994, pp. 165–170).

SUMMARY OF THE INVENTION

The object of the invention is to produce a composite carbon/polymer electrode whose reversible capacity is higher than 1000 mAh/g or higher than 1.5 mAh/cm$^2$ at a discharge rate J greater than 1 mA/cm$^2$.

To achieve this object, the invention provides a composite carbon/polymer electrode for a rechargeable electrochemical lithium cell which includes a powder of carbonaceous material and a coating polymer rendered ionically conductive by the addition of a lithium salt, characterized in that the amount of volatile matter in this carbonaceous material is between 5 and 22 wt %, preferably between 10 and 22 wt %. The amount of volatile matter can be determined by thermogravimetry or calorimetry (ATG) according to the test code of ASTM Standard D3175-89a (which corresponds to NF-ISO-9406).

As the examples presented below confirm, the reversible capacities do not attain the desired objective when the amount of volatile matter is lower than 5 wt %. On the other hand, amounts of volatile matter higher than 22 wt % are incompatible with the thermal stability criteria required by the utilization. The highest residual reversible capacities result from amounts of volatile matter between 10 and 22 wt %.

The carbonaceous material is preferably a raw coke or a semi-coke. The average particle size of the powder of carbonaceous material according to the invention is preferably less than or equal to 10 µm.

The carbonaceous material can be pre-lithiated, that is chemically lithiated before the manufacture of the electrode.

The coating polymer is chosen from among the products generally used to obtain composite carbon/polymer electrodes, preferably the polyvinylidene fluorides (PVDF), the polyethylenes (PE), the polyoxyethylenes (POE), and the polytetrafluoroethylenes (PTFE).

The lithium salt is chosen from among the lithium salts generally used to obtain composite carbon/polymer electrodes, the anion of which is preferably peroxidized (as in LiClO$_4$) or perfluorinated (as in LiC$_a$F$_{2a+1}$SO$_3$, in which n=1, 2, 3, 4, 5 or 6).

According to a variation of the invention, the composite carbon/polymer electrode includes carbon black or carbon fibers in addition to the powder of carbonaceous material and the coating polymer rendered ionically conductive by the addition of a lithium salt, in order to improve the electrical conductivity of the electrode.

The principal advantage of the composite carbon/polymer electrode according to the invention is that it makes it possible to obtain reversible capacities which are sharply higher than the known values using readily available carbonaceous materials.

The present invention is also directed to a process for manufacturing the composite carbon/polymer electrode according to the invention. According to the manufacturing process of the invention, the carbonaceous material is dried under vacuum or in an atmosphere of neutral gas, such as an inert gas, at a temperature which does not exceed 600° C. then finely ground so as to produce a powder with an average particle size which is less than or equal to 10 μm. The powder thus obtained is then intimately mixed with a coating polymer and with a lithium salt to make it ionically conductive. The mixture thus obtained is called the precursor of the composite carbon/polymer electrode.

If the electrode is intended for volume cells, the precursor is compressed at a uniaxial or isostatic pressure greater than 5 MPa so as to form a compact electrode.

If the electrode is intended for flat cells, the precursor is combined with a dissolving and fluidizing agent, such as acetonitrile, then poured onto the surface of a metal collector, such as a nickel or stainless steel wafer. The electrode/collector assembly thus obtained is finally dried at ambient temperature in a dry atmosphere and/or degassed under low vacuum before being mounted in the cell.

According to a variation of the manufacturing process according to the invention, prior to being mounted in the cell, the electrode/collector assembly is compressed at a pressure greater than 5 MPa applied uniaxially perpendicular to the plane of the electrode/collector assembly and/or heated to a temperature lower than 180° C. during the compression.

According to another variation of the manufacturing process of the invention, the powder of carbonaceous material undergoes a pre-lithiation treatment before being mixed with the coating polymer and the lithium salt.

According to yet another variation of the manufacturing process of the invention, the composite carbon/polymer electrode undergoes a chemical lithiation treatment before being mounted in the cell.

The advantage of the process for manufacturing a composite carbon/polymer electrode according to the invention is that it preserves the amount of volatile matter in the carbonaceous material and consequently the reversible capacity.

Yet another object of the present invention is to provide a rechargeable electrochemical lithium cell which includes a negative electrode, a positive electrode and an electrolyte. The negative electrode is a composite carbon/polymer electrode according to the invention. The positive electrode preferably has a base of transition metal oxides chosen from among the lithiated oxides of cobalt, such as $LiCoO_2$, of nickel, such as $LiNiO_2$, of manganese, such as $Li_xMnO_2$, and of vanadium, such as $Li_yVO_x$, and their mixtures. The electrolyte is a non-aqueous liquid solvent, a polymer in gel form or a solid polymer, the electrolyte being rendered ionically conductive by the addition of a lithium salt. The non-aqueous liquid solvent is preferably composed of a mixture of ethers and/or esters, the esters being chosen from among the linear carbonates and the cyclic carbonates. The polymer is preferably chosen from among polyethers, polyesters, polymethoxyethoxyphosphazenes (MEEP) or polydialkylsiloxanes. The gel preferably comprises a polyacrylonitrile (PAN) and an ethylene carbonate and/or a propylene carbonate.

According to a variation of the invention, after its assembly the electrochemical cell undergoes an activation treatment which consists of heating it to a temperature which is higher than ambient temperature but preferably lower than 180° C., with or without applying pressure. A temperature higher than 180° C. alters the properties of the polymer, making it very fluid, which can cause short circuiting problems, in particular. The pressure, which is preferably higher than 5 MPa, can be applied uniaxially or isostatically.

EXAMPLES

Example 1

Figure 1:
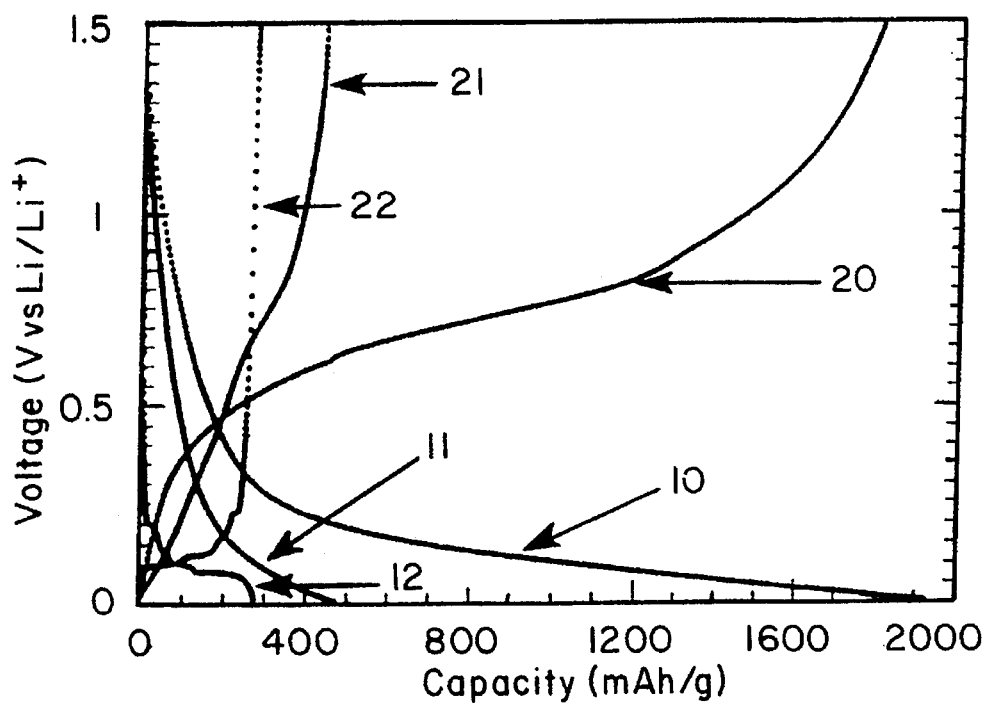
FIG. 1 is a graph of voltage vs. specific reversible capacity corresponding to Examples 1 and 3. The curves 20, 21, 22 and 10, 11, 12 correspond, respectively, to the charge and the discharge in the tests A, G, F.
Figure 2:
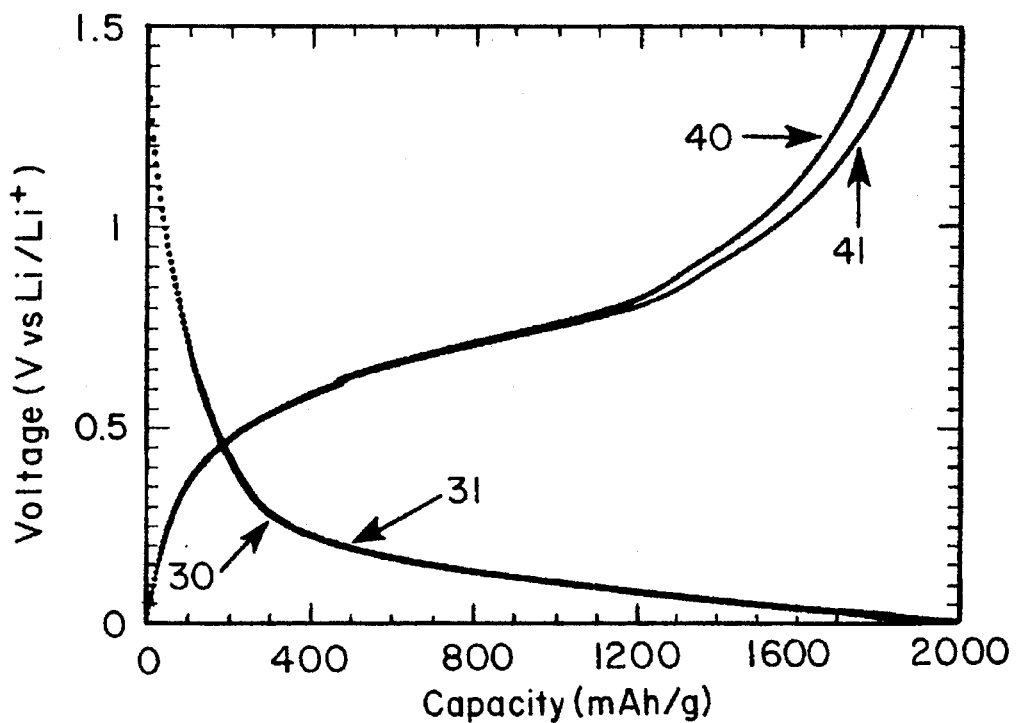
FIG. 2 is a graph of voltage vs. specific reversible capacity corresponding to Example 4. The curves 40, 41 and 30, 31 correspond, respectively, to the charge and the discharge in the tests A and H.

The following constituents were used in the proportions (by weight): 60% raw coke, 10% carbon black and 30% coating polymer.

The amount of volatile materials in the raw coke used was 22 wt %. The raw coke was ground so as to produce a powder with an average particle size equal to 4 μm, then degassed under low vacuum at 300° C. for one hour.

The coating polymer was POE with an average molecular weight equal to 300,000, which was rendered ionically conductive by mixing with $LiClO_4$ according to the formula $(POE)_8LiClO_4$.

The precursor was formed by intimately mixing the raw coke powder, the carbon black and the ionically conductive coating polymer.

In order to form an electrode/collector assembly, the precursor was placed in suspension in acetonitrile, then deposited uniformly on a stainless steel wafer with a diameter of 16 mm (the collector). Finally, this electrode/collector assembly was dried at ambient temperature for 20 minutes, then degassed under low vacuum for 4 hours. The final thickness of the composite carbon/polymer electrode on the collector was on the order of 20 μm. The electrode/collector assembly was then compressed at a uniaxial pressure of 200 MPa at ambient temperature.

For the test measurements, the composite carbon/polymer electrode was mounted in a button-type cell, in accordance with the usual techniques, by stacking the three basic elements: the electrode/collector assembly, the electrolyte, and a counterelectrode constituted of metallic lithium, which made it possible to determine the intrinsic characteristics of the composite carbon/polymer electrode without any significant influence of the counterelectrode. The electrolyte was POE with an addition of $LiClO_4$. All the mounting operations were carried out in a glove box in an argon atmosphere. Finally, the button cell was brought to 100° C. for 20 minutes at a uniaxial pressure of 20 MPa.

The charge/discharge cycles were carried out at a temperature of 100° C. (so as to reduce the effect of the ohmic drop in the POE) in a galvanostatic state between two potential limit values of 5 mV (after the discharge) and 1.5 V (after the charge). The discharge was carried out under four different conditions, according to the accepted nomenclature: C/20 (Test A), C/5 (Test B), C/2 (Test C) and C/1 (Test D). These discharge conditions correspond, respectively, to discharge rates of 0.22, 0.87, 2.18, 4.36 $mA/cm^2$.

The results are presented in Table I.

TABLE I

| Test | J (mA/cm$^2$) | Qr (mAh/g) | Qs (mAh/cm$^2$) |
|---|---|---|---|
| A (C/20) | 0.22 | 1807 | 2.70 |
| B (C/5) | 0.87 | 1644 | 2.46 |
| C (C/2) | 2.18 | 1190 | 1.78 |
| D (C/1) | 4.36 | 873 | 1.31 |

It is noted that the specific reversible capacity values are sharply higher than 325 mAh/g and that, at a discharge current density greater than 1 mA/cm$^2$, the values are very high, that is, they can exceed 1000 mAh/g in specific value or 1.5 mAh/cm$^2$ in surface value.

Tests conducted without any uniaxial compression of the electrode/collector ensemble before the assembly of the cell showed values 15% lower than those in Table I. Therefore, the values remain quite high, but they confirm the favorable effect of the compression.

Example 2

A button cell was obtained in the same way as in Example 1, with the same constituents except for the carbonaceous material, which in this case was a semi-coke whose proportion of volatile matter was measured at 13 wt %.

The measurements were carried out according to the same procedure, but at a single discharge rate, namely that of the C/5 condition.

The reversible capacity in this case (Test E) was measured at 1340 mAh/g in specific value and 2.0 mAh/cm$^2$ in surface value.

Example 3

In order to compare the performances of the electrode according to the invention to the prior art, tests were conducted with carbonaceous materials whose proportion of volatile matter was lower than 5 wt %.

For this purpose, button cells were obtained in the same way as in Example 1, with the same constituents except for the carbonaceous material, which in this case was either a graphitized carbon(Test F), or a raw coke which had been subjected to a heat treatment for 60 minutes at 1000° C. (Test G).

The measurements were carried out according to the same procedure, but with a single discharge rate, namely that of the C/20 condition.

The results are reported in Table II. T % designates the proportion of volatile matter.

TABLE II

| Test | T% | J (mA/cm$^2$) | Qr (mAh/g) | Qs (mAh/cm$^2$) |
|---|---|---|---|---|
| A | 22 | 0.22 | 1807 | 2.70 |
| F | 0.5 | 0.22 | 270 | 0.41 |
| G | 1.0 | 0.22 | 431 | 0.65 |

Example 4

In order to demonstrate the effect of the chemical lithiation on the Faraday yield of the first cycle and on the reversible capacity of the composite carbon/polymer electrode, a sample of raw coke was first degassed under vacuum at 300° C., then treated with a molecular solution of naphthalene-lithium in tetrahydrofuran (THF). After a one week long reaction, the powder was washed several times with the THF, then dried at 100° C. and used under the same conditions as in Example 1. The electrochemical tests were carried out under only one condition, namely C/20 (Test H). Table III shows the results, in which $R_1$ corresponds to the Faraday yield of the first (charge/discharge) cycle.

It is noted that the Faraday yield of the first cycle as well as of Qr and Qs were increased by the prelithiation.

TABLE III

| Test | $R_1$ (%) | J (mA/cm$^2$) | Qr (mA/cm$^2$) | Qs (mAh/g) |
|---|---|---|---|---|
| A | 72 | 0.22 | 1807 | 2.70 |
| H | 94 | 0.22 | 1880 | 2.81 |

What is claimed is:

1. A composite carbon/polymer electrode for a rechargeable lithium cell comprising a carbonaceous material and a coating polymer rendered ionically conductive by the addition of a lithium salt, said carbonaceous material containing an amount of volatile matter between 5 and 22 wt %.

2. The electrode according to claim 1, wherein said amount of volatile matter is between 10 and 22%.

3. The electrode according to claim 1, wherein said carbonaceous material is a semi-coke.

4. The electrode according to claim 1, wherein said carbonaceous material is a raw coke.

5. The electrode according to claim 1, wherein said carbonaceous material is a powder of average particle size less than or equal to 10 μm.

6. The electrode according to claim 1, wherein said carbonaceous material is pre-lithiated.

7. The electrode according to claim 1, additionally comprising carbon black or carbon fibers.

8. The electrode according to claim 1, wherein said coating polymer is a polyvinylidene fluoride (PVDF), a polyoxyethylene (POE), a polyethylene (PE) or a polytetrafluoroethylene (PTFE).

9. The electrode according to claim 1, wherein the lithium salt contains a peroxidized or perfluorinated anion.

10. The electrode according to claim 9, wherein the lithium salt is LiClO$_4$ or LiC$_a$F$_{2a+1}$SO$_3$, where n=1–6.

11. A rechargeable electrochemical lithium cell comprising an electrolyte, a negative electrode and a positive electrode with a base of transition metal oxide selected from the group consisting of lithiated oxides of cobalt, nickel, manganese, vanadium, and mixtures thereof, said negative electrode comprising a composite carbon/polymer electrode comprising a carbonaceous material and a coating polymer rendered ionically conductive by the addition of a lithium salt, said carbonaceous material containing and amount of volatile matter between 5 an 22 wt %.

12. The cell according to claim 11, wherein said electrolyte is a non-aqueous liquid solvent rendered conductive by the addition of a lithium salt.

13. The cell according to claim 12, wherein said non-aqueous solvent comprises a mixture of ethers and/or esters, the esters being selected from the group consisting of linear carbonates and the cyclic carbonates.

14. The cell according to claim 11, wherein said electrolyte is a solid polymer rendered conductive by the addition of a lithium salt.

15. The cell according to claim 14, wherein said solid polymer is a polyether, a polyester, a polymethoxyethoxyphosphazene (MEEP) or a polydialkylsiloxane.

16. The cell according to claim 11, wherein said electrolyte is a polymer in gel form rendered conductive by the addition of a lithium salt.

17. The cell according to claim 16, wherein said polymer in gel form comprises a polyacrylonitrile (PAN) and an ethylene carbonate and/or a propylene carbonate.

* * * * *

UNITED STATES PATENT AND TRADEMARK OFFICE
CERTIFICATE OF CORRECTION

PATENT NO. : 5,605,772
DATED : February 25, 1997
INVENTOR(S) : RACHID YAZAMI et al It is certified that error appears in the above-indentified patent and that said Letters Patent is hereby corrected as shown below:

Column 2, line 6, change "0.5 mAh/cmin" to --0.5 mAH/cm² in--.

Column 2, line 54, change "LiC$_a$F$_{2a+1}$SO$_3$" to --LiC$_n$F$_{2n+1}$SO$_3$--.

Claim 10, line 2, change "LiC$_a$F$_{2a+1}$SO$_3$" to --LiC$_n$F$_{2n+1}$SO$_3$--.

Signed and Sealed this

Twentieth Day of May, 1997

*Attest:*

*Attesting Officer*

BRUCE LEHMAN

Commissioner of Patents and Trademarks